(12) United States Patent
Reznichenko et al.

(10) Patent No.: US 11,753,486 B2
(45) Date of Patent: Sep. 12, 2023

(54) CATALYST AND PREPARATION THEREOF

(71) Applicant: BOREALIS AG, Vienna (AT)

(72) Inventors: Alexander Reznichenko, Porvoo (FI); Jari-Jussi Ruskeeniemi, Porvoo (FI); Joseph Thorman, Moorhead, MN (US); Xiao Dong Chen, Suzhou (CN); Victor Sumerin, Porvoo (FI)

(73) Assignee: BOREALIS AG, Vienna (AT)

( * ) Notice: Subject to any disclaimer, the term of this patent is extended or adjusted under 35 U.S.C. 154(b) by 189 days.

(21) Appl. No.: 16/771,306

(22) PCT Filed: Dec. 20, 2018

(86) PCT No.: PCT/EP2018/086242
§ 371 (c)(1),
(2) Date: Jun. 10, 2020

(87) PCT Pub. No.: WO2019/129650
PCT Pub. Date: Jul. 4, 2019

(65) Prior Publication Data
US 2021/0079128 A1    Mar. 18, 2021

(30) Foreign Application Priority Data
Dec. 28, 2017    (EP) ................................ 17210884

(51) Int. Cl.
*C08F 4/02*      (2006.01)
*C08F 4/654*     (2006.01)
(Continued)

(52) U.S. Cl.
CPC ............. *C08F 4/651* (2013.01); *B01J 2/04* (2013.01); *B01J 4/002* (2013.01); *C08F 4/022* (2013.01);
(Continued)

(58) Field of Classification Search
CPC . C08F 4/022; C08F 4/654; B01D 1/18; B01D 1/20; B01J 2/04
See application file for complete search history.

(56) References Cited

U.S. PATENT DOCUMENTS 3,219,652 A    11/1965  Hill et al.
3,953,414 A *  4/1976  Galli ................... C08F 4/022
                                                526/125.4
(Continued)

FOREIGN PATENT DOCUMENTS

CN    102399325 A    4/2012
CN    202844967 U    4/2013
(Continued)

OTHER PUBLICATIONS

International Search Report and Written Opinion dated Apr. 5, 2019, from International Application No. PCT/EP2018/085992, 14 pages.
(Continued)

*Primary Examiner* — Caixia Lu
(74) *Attorney, Agent, or Firm* — Meunier Carlin & Curfman LLC

(57) ABSTRACT

The present invention relates to a process for producing of solid particulate olefin polymerisation catalyst or catalyst carrier comprising forming a solution of the catalyst or a catalyst carrier in a solvent, subjecting the solution into an atomization by spraying the solution via a capillary vibrating spray nozzle with a capillary orifice having a diameter of 5 to 100 μm generating a laminar jet of liquid, which disintegrates into liquid droplets entering into the spray-dryer, transforming the droplets with aid of a gas to solid particulate catalyst or carrier in the spray-dryer and recovering the solid particulate olefin polymerisation catalyst or carrier having particle size distribution defined by a volumetric SPAN of 0.7 or less. The invention further relates to the
(Continued)

Figure 1:
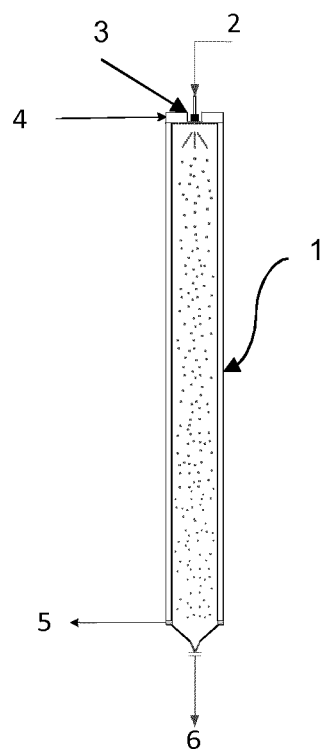

catalyst produced by the methods, and use thereof in olefin polymerisation process.

8 Claims, 2 Drawing Sheets

(51) Int. Cl.
*B01J 2/04* (2006.01)
*B01D 1/18* (2006.01)
*B01D 1/20* (2006.01)
*C08F 4/651* (2006.01)
*B01J 4/00* (2006.01)
*C08F 210/16* (2006.01)

(52) U.S. Cl.
CPC .......... *C08F 4/6543* (2013.01); *C08F 210/16* (2013.01); *B01D 1/18* (2013.01); *B01D 1/20* (2013.01); *C08F 2500/12* (2013.01); *C08F 2500/18* (2013.01); *C08F 2500/24* (2013.01)

(56) References Cited

U.S. PATENT DOCUMENTS

| | | | |
|---|---|---|---|
| 4,071,674 | A | 1/1978 | Kashiwa et al. |
| 4,399,054 | A | 8/1983 | Ferraris et al. |
| 4,465,783 | A * | 8/1984 | McKenzie .............. C08F 10/00 502/103 |
| 4,525,555 | A | 6/1985 | Tajima et al. |
| 4,665,208 | A | 5/1987 | Wellborn et al. |
| 4,874,734 | A | 10/1989 | Kioka et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,968,827 | A | 11/1990 | Davis |
| 5,055,535 | A | 10/1991 | Spitz et al. |
| 5,091,352 | A | 2/1992 | Kioka et al. |
| 5,103,031 | A | 4/1992 | Smith |
| 5,157,137 | A | 10/1992 | Sangokoya |
| 5,200,502 | A | 4/1993 | Kao et al. |
| 5,204,419 | A | 4/1993 | Tsutsui et al. |
| 5,206,199 | A | 4/1993 | Kioka et al. |
| 5,231,153 | A | 7/1993 | Hsu et al. |
| 5,235,081 | A | 8/1993 | Sangokoya |
| 5,248,801 | A | 9/1993 | Sangokoya |
| 5,308,815 | A | 5/1994 | Sangokoya |
| 5,329,032 | A | 7/1994 | Tran et al. |
| 5,391,529 | A | 2/1995 | Sangokoya |
| 5,391,793 | A | 2/1995 | Marks et al. |
| 5,672,669 | A | 9/1997 | Wasserman et al. |
| 5,674,795 | A | 10/1997 | Wasserman et al. |
| 5,693,838 | A | 12/1997 | Sangokoya |
| 5,731,253 | A | 3/1998 | Sangokoya |
| 5,731,451 | A | 3/1998 | Smith et al. |
| 5,744,656 | A | 4/1998 | Askham |
| 6,150,478 | A * | 11/2000 | Ramamurthy .......... C08F 10/00 526/901 |
| 6,693,160 | B1 | 2/2004 | Halasa et al. |
| 7,341,971 | B2 | 3/2008 | Denifl et al. |
| 8,575,283 | B1 | 11/2013 | Fang et al. |
| 8,604,143 | B2 | 12/2013 | Wang et al. |
| 9,200,094 | B2 | 12/2015 | Brita et al. |
| 9,593,178 | B2 | 3/2017 | Brita et al. |
| 9,920,149 | B2 | 3/2018 | Steinhauser et al. |
| 10,118,977 | B2 | 11/2018 | Sumerin et al. |
| 10,351,641 | B2 | 7/2019 | Brita et al. |
| 10,752,721 | B2 | 8/2020 | Bartlomiej et al. |
| 2007/0021295 | A1 | 1/2007 | Morini et al. |
| 2007/0049711 | A1 | 3/2007 | Kuo et al. |
| 2011/0245070 | A1 | 10/2011 | Brita et al. |
| 2012/0329963 | A1 | 12/2012 | Brita et al. |
| 2013/0289229 | A1 | 10/2013 | Castro et al. |
| 2014/0378631 | A1 | 12/2014 | Brita et al. |

FOREIGN PATENT DOCUMENTS

| | | |
|---|---|---|
| CN | 103619475 A | 3/2014 |
| CN | 103180348 B | 8/2015 |
| CN | 204699418 U | 10/2015 |
| CN | 103752431 B | 12/2015 |
| CN | 104492108 B | 6/2016 |
| DE | 19617924 A1 | 11/1997 |
| DE | 19739747 A1 | 3/1999 |
| EP | 0376936 A2 | 4/1990 |
| EP | 0424049 A2 | 10/1991 |
| EP | 0561476 A1 | 9/1993 |
| EP | 0428054 B1 | 1/1994 |
| EP | 0594218 A1 | 4/1994 |
| EP | 0279586 B1 | 5/1994 |
| EP | 0424049 B1 | 12/1995 |
| EP | 0614467 B1 | 2/1996 |
| EP | 0376936 B1 | 4/1996 |
| EP | 0537130 B1 | 9/1996 |
| EP | 0591224 B1 | 2/1998 |
| EP | 0688794 B1 | 8/1998 |
| EP | 0655073 B1 | 12/1998 |
| EP | 1057523 A1 | 6/2000 |
| EP | 1057523 B1 | 2/2004 |
| EP | 0810235 B1 | 11/2004 |
| EP | 0423101 B2 | 5/2006 |
| EP | 1803743 A1 | 7/2007 |
| EP | 2065405 A1 | 6/2009 |
| EP | 2186832 A1 | 5/2010 |
| EP | 2386582 A1 | 11/2011 |
| EP | 2532687 A2 | 12/2012 |
| EP | 2600130 B1 | 2/2016 |
| EP | 2746306 B1 | 10/2017 |
| GB | 2167763 A | 6/1986 |
| JP | 2017530245 A | 10/2017 |
| WO | 1992/012182 A1 | 7/1992 |
| WO | 1992/021705 A1 | 12/1992 |
| WO | 1994010180 A1 | 5/1994 |
| WO | 1996/018662 A1 | 6/1996 |
| WO | 1997010248 A1 | 3/1997 |
| WO | 1997028170 A1 | 8/1997 |
| WO | 1998040331 A1 | 9/1998 |
| WO | 1998046616 A1 | 10/1998 |
| WO | 1998049208 A1 | 11/1998 |
| WO | 1998/058975 A1 | 12/1998 |
| WO | 1998056831 A1 | 12/1998 |
| WO | 1999010353 A1 | 3/1999 |
| WO | 1999012981 A1 | 3/1999 |
| WO | 1999019335 A1 | 4/1999 |
| WO | 1999041290 A1 | 8/1999 |
| WO | 1999/051646 A1 | 10/1999 |
| WO | 2000008034 A1 | 2/2000 |
| WO | 2000034341 A2 | 6/2000 |
| WO | 2001/055230 A1 | 8/2001 |
| WO | 2001070395 A2 | 9/2001 |
| WO | 2002002576 A1 | 1/2002 |
| WO | 2003/000754 A1 | 1/2003 |
| WO | 2003/000757 A1 | 1/2003 |
| WO | 2003005194 A2 | 1/2003 |
| WO | 2003/051934 A2 | 6/2003 |
| WO | 2004/029112 A1 | 4/2004 |
| WO | 2004055065 A1 | 7/2004 |
| WO | 2005105863 A2 | 11/2005 |
| WO | 2005/118655 A1 | 12/2005 |
| WO | 2006/063771 A1 | 6/2006 |
| WO | 2006069733 A1 | 7/2006 |
| WO | 2006097497 A1 | 9/2006 |
| WO | 2007051607 A1 | 5/2007 |
| WO | 2007096255 A1 | 8/2007 |
| WO | 2007107448 A1 | 9/2007 |
| WO | 2007116034 A1 | 10/2007 |
| WO | 2007/137849 A1 | 12/2007 |
| WO | 2007/137853 A1 | 12/2007 |
| WO | 2009027075 A2 | 3/2009 |
| WO | 2009054832 A1 | 4/2009 |
| WO | 2011076443 A1 | 6/2011 |
| WO | 2011076618 A1 | 6/2011 |
| WO | 2011138211 A1 | 11/2011 |
| WO | 2012/007430 A1 | 1/2012 |

(56) References Cited

FOREIGN PATENT DOCUMENTS

| WO | 2012001052 A2 | 1/2012 |
|---|---|---|
| WO | 2012143303 A1 | 10/2012 |
| WO | 2012149360 A1 | 11/2012 |
| WO | 2013007650 A1 | 1/2013 |
| WO | 2013/070601 A2 | 5/2013 |
| WO | 2013/098137 A1 | 7/2013 |
| WO | 2013/098138 A1 | 7/2013 |
| WO | 2013/098149 A1 | 7/2013 |
| WO | 2014004396 A1 | 1/2014 |
| WO | 2015062936 A1 | 5/2015 |
| WO | WO2016057634 A1 | 4/2016 |
| WO | 2016/097193 A1 | 6/2016 |
| WO | 2016/145179 A1 | 9/2016 |

OTHER PUBLICATIONS

Binks, Bernard P., and Andrew T. Tyowua. "Oil-in-oil emulsions stabilized solely by solid particles." Soft Matter 12.3 (2016):876-887.
Chevalier, Yves, and Marie-Alexandrine Bolzinger. "Emulsions stabilized with solid nanoparticles: Pickering emulsions." Colloids and Surfaces A: Physiochemical and Engineering Aspects 439 (2013): 23-24.
Britovsek, George JP, Vernon C. Gibson, and Duncan F. Wass. "The search for new-generation olefin polymerization catalysts: life beyond metallocenes." Angewandte Chemie International Edition 38.4 (1999): 428:447.
Enders et al., "Die fluorige Phase: Organische Chemie mit hochfluorierten Reagenzien and Losungsmitteln", Chemie in unserer Zeit, Jahrg., 2000, 6, 34, 382-393.] English Abstract included.
Nostro, Pierandrea Lo. "Phase separation properties of fluorocarbons, hydrocarbons and their copolymers." Advances in colloid and interface science 56 (1995): 245-287.
Atwood, "Anionic and Cationic Organoaluminum Compounds"Coord. Chem. Alum., 1993, 197-32.
Holbrey, John D., et al. "Liquid clathrate formation in ionic liquid-aromatic mixtures." Chemical Communications 4 (2003): 476-477.
Scott K. Spear, "Liquid Clathrates", Encyclopedia of Supramolecular Chemistry, 2001, 804-807.
Alt et al., "Bimodal polyethylene-Interplay of catalyst and process", Macromol. Symp. pp. 135-143 (2001).
International Search Report and Written Opinion dated Apr. 29, 2019 in International Application No. PCT/EP2018/086893 (11 pages).
Non-Final Office Action issued in U.S. Appl. No. 16/771,307 dated Oct. 18, 2021.
Notice of Allowance issued in U.S. Appl. No. 16/771,307 dated Mar. 1, 2022.
Non-Final Office Action issued in U.S. Appl. No. 16/771,305 dated Dec. 7, 2021.
International Search Report and Written Opinion dated Apr. 3, 2019 from International Application PCT/EP2018/086242, 12 pages.

\* cited by examiner

CATALYST AND PREPARATION THEREOF

This invention relates to a method for producing a solid particulate catalyst carrier and catalyst for producing olefin polymers. Further, the invention relates to a catalyst prepared by the method and a catalyst system comprising said solid catalyst, Group 13 metal compound as a cocatalyst or as an activator and optionally an external electron donor. The invention further relates to the use of said catalyst for producing olefin polymers, especially ethylene and propylene polymers.

BACKGROUND OF THE INVENTION

Olefin polymerisation catalysts, like Ziegler-Natta and single-site catalysts are well known in the art.

Ziegler-Natta (ZN) catalysts has been used already several decades for producing olefin polymers, like $C_2$ to $C_{10}$ olefin polymers and (co)polymers thereof with other α-olefins of 3 to 12 C-atoms. Generally, a ZN catalyst comprises a compound of a transition metal of Group 4 to 10 or of lanthanide or actinide of the Periodic Table (IUPAC, Nomenclature of Inorganic Chemistry, 1989), a compound of a metal of Group 1 to 3 of the Periodic Table (IUPAC), and optionally a compound of a metal of Group 13 of the Periodic Table (IUPAC), and optionally, an internal electron donor. A ZN catalyst system comprises in addition cocatalyst and optionally an external electron donor.

A great variety of Ziegler-Natta catalysts have been developed to fulfill the different demands in reaction characteristics and in producing olefin polymers of desired physical and mechanical performance. Typical solid Ziegler-Natta catalysts contain a titanium compound, a magnesium compound, and optionally an aluminium compound supported on a particulate support. The commonly used particulate supports are Mg dihalide, preferably $MgCl_2$, based supports, or inorganic oxide type supports, such as silica, alumina, titania, silica-alumina and silica-titania, typically silica.

Ziegler-Natta catalysts supported on inorganic oxide type supports may be prepared by sequentially contacting the inorganic oxide support with the above mentioned compounds, for example, as described in EP 688794 and WO 99/51646. Alternatively, the catalyst may be prepared by first preparing a solution from the components and then contacting the solution with a support, as described in WO 01/55230. A commonly used inorganic oxide support is silica. The average particle size of the silica support is typically from 5 to 100 µm.

Another way to produce solid ZN catalysts is based on a method, where all catalyst components are reacted in solution and the solid catalyst is obtained by solidification or precipitation method. Such preparation method is described e.g. in patent publications WO2003/000757, WO2003/000754, WO2004/029112 WO2007/137849, WO2007/137853, WO2012/007430, WO2013/098149, WO2013/098137 and WO2013098138. Precipitated catalysts are described e.g. in WO2005/118655.

Still another type of Ziegler-Natta catalyst is supported on $MgCl_2$ based support and contains a titanium compound and optionally a Group 13 compound, for example, an aluminium compound. Such catalysts are disclosed, for instance, in EP376936 and EP591224 describing spray-crystallisation methods for producing $MgCl_2$-based support materials.

A substantial prior art knowledge exists in the area of spray-formed polyolefin catalysts and carriers. WO9221705 describes the preparation of $MgCl_2*xEtOH$ carrier in particulate form using a rotating atomizer spray crystallization process. The particulate material obtained from the process has a disclosed to have a particle size distribution defined by SPAN below 1.5.

EP0424049A teaches the preparation of $MgCl_2*xEtOH$ carrier particles via spray-crystallization of the $MgCl_2*3.5EtOH$ melt using an ultrasonic vibrating nozzle and nitrogen gas flow as a cooling aid. The carrier is recovered in the form of solid particles with a SPAN of 1.3 and the average size ranging from 30 to 50 microns.

Solid single-site catalysts (SSC) comprise organometal compounds of a transition metal of Group 3 to 10, or a lanthanide or actinide, typically of transition metals of group 4 to 6 metals. Typically, SSC catalysts comprise also a compound of Group 13 metal. Solid single-site catalysts (SSC) are typically loaded on inorganic oxide type supports, such as silica, alumina, titania, silica-alumina and silica-titania, typically silica.

Still another way to produce solid SSC catalysts is based on a method, where all catalyst components are reacted in solution and the solid catalyst is obtained by an emulsion-solidification method, described e.g. in WO2003/051934, or by a precipitation method.

Spray-drying of single site catalyst compositions is described e.g. patent publications U.S. Pat. Nos. 5,672,669 and 5,674,795 of Union Carbide. These publications disclose the preparation of single-site catalyst composition on a support (e.g. silica) or inert filler (e.g. polystyrene) via spray-drying of the suspension of the catalyst/cocatalyst and the filler. Particle size of the catalyst is claimed to be between 5 and 500 microns.

WO 2016145179A1 describes a process for producing supported single-site catalyst, where silica is used as a support, MAO as an activator, and rotating atomizer is used to disperse the suspension of supported catalyst in the spraying unit.

Spray-drying of an activator optionally in the presence of other catalyst components has been disclosed in WO 2013070601 or US20070049711 of Univation.

The above described ZN and SSC catalysts are disclosed to be suitable for olefin polymerisation, for example for producing polymers of α-olefins of 2 to 10 C-atoms, especially of ethylene, propylene, 1-butene or (co)polymers thereof with ethylene and/or other α-olefins of 3 to 12 C-atoms.

Catalysts in liquid form may be used in polymerisation, as disclosed e.g. in EP1051523A1 describing a process in which a liquid catalyst composition is fed to a fluidised bed gas phase polymerisation reactor through an ultrasonic nozzle.

The advantages, like low cost, easy to scale-up etc. of spray-crystallisation or spray-drying have been industrially applied to polyolefin catalyst and procatalysts/carrier preparation quite extensively. However, none of the disclosed routes allows for a precise control of the morphology and size of the catalyst or a catalyst carrier particles and particle size distribution.

Thus, the obtained particle size distribution (PSD) is too broad or fluctuates from batch to batch obtained by classic spray-crystallization, or is limited by the PSD of the external carrier, or is not possible to control during the preparation.

Catalyst particle size (PS) and particle size distribution (PSD) are of high importance in polymerisation process and at least a reasonable uniform particle size distribution is desired.

As indicated above particle morphology of supported catalysts is highly dependent on the morphology of the support material. $MgCl_2$-based supports or catalysts prepared by conventional spray-crystallisation methods result easily in particulate material having non-desired and too broad PSD due to difficulties in controlling the PSD during the preparation method. On the other hand, catalysts based on external inorganic oxide supports, like silica supports, have a drawback being highly dependent on said external support material, which typically has at least a reasonable broad particle size distribution. Further, catalysts preparation by emulsion-solidification method is very sensitive and morphology, particle size and size distribution of the catalyst may vary within wide ranges depending on chemical and physical conditions during the preparation steps, e.g. during the solidification step. Catalyst preparation by a precipitation method is not easy to control either. For clarity, support and carrier have the same meaning in this application and these terms are exchangeable.

In order to obtain solid particulate catalytic material, i.e. solid catalyst and catalyst carrier, with a desired narrow particle size distribution, the particulate material may be classified as regards the particle size and particle size distribution after preparation thereof by using conventional screening techniques. Using such a separate screening step is possible to provide a catalyst or carrier in the form of solid particles having more uniform particle size, i.e. a more narrow particle size distribution. One commonly used method for screening the particles is sieving. However, even if the sieving method allows removal of some non-desired fractions from the particulate material, the particulate material may still have a relatively broad particle size distribution. Some fines (i.e. a fraction of very small particles) of a catalyst or catalyst carrier may be also removed e.g. together with a liquid (e.g. wash liquids).

A remarkable drawback is that, any screening step means always an extra step in catalyst preparation.

In addition, it is not only the removal of the non-desired catalyst particles, which causes extra costs and extra work, due to said extra process step. The removed catalyst part, i.e. non-desired particles, is waste material, which is to be handled according to the strict environmental requirements and rules. On the other hand, if e.g. catalyst fines are not removed, it will result in problems in later use, e.g. plugging in reactors and process lines.

Even though catalyst with a reasonable narrow particle size distribution (PSD) are disclosed in patent literature there is still room for providing catalyst having desired still narrower PSD. Especially it would be highly appreciated to provide a method for producing particulate olefin catalyst, or catalyst support with a desired very narrow particle size distribution (PSD) without the need of using any screening step after the formation thereof for removing the non-desired particulate parts. Another beneficial consequence of omitting any extra removal step is the increased yield of the catalytic material in the preparation. Further, it is highly desired to find a method, where the particle size and particle size distribution of the solid, particulate olefin catalyst or carrier is possible to control during the preparation thereof in order to obtain particulate olefin catalyst, or catalyst carrier with the desired particle size and particle size distribution.

Due to the replica effect polymer particles will follow the morphology of the catalyst particles, i.e. a particulate catalyst with narrow particle size distribution should result in polymers having similar particle size distribution, however the resulting polymer will naturally be of bigger particle size. Polymers with a narrow particle size distribution are easier to handle in post reactor processes like in powder conveying and drying. Further, presence of very small particles, i.e. fines, causes problems in the polymerisation reactors and post reactor processes.

Thus, finding a way to prepare solid, particulate olefin polymerisation catalyst or catalyst support in a way, where the particle size and particle size distribution thereof is possible to control in an effective way already during the preparation thereof to provide the olefin catalyst or catalyst carrier with desired narrow particle size distribution is thus highly desired. By providing such an improved preparation method a particle classification step, like screening, can be avoided, which is highly desired. In addition, such a method should be reliable and robust enough to avoid any increase in costs and further problems in the manufacturing.

In prior art there are described methods for producing liquid droplets with uniform droplet size by using a nozzle with a capillary orifice generating a laminar jet of liquid, which disintegrates into droplets. Spray-nozzles described in prior art are e.g. rotary disk nozzles or vibrating nozzles, like ultrasonic vibrating nozzles.

CN202844967U, CN204699418U and CN104492108 describe a device for forming uniform particles in a the device comprising an accumulator, an equal diameter droplet generator and a spray dryer, known as microfluidic jet spray drying method. Mechanical perturbation is applied to the nozzle via e.g. piezo-ceramic element connected to the frequency generator.

Formation of the monodispersed liquid jet using e.g. a vibrating nozzle plate with multiple orifice openings is described in DE19617924, DE19739747 and CN103752431B.

The prior art documents as disclosed above, describing a nozzle generating a laminar jet of liquid do not describe, not even mention, that the devices and methods described in said publications would be used for preparation of olefin polymerisation catalyst or catalyst carriers.

SUMMARY OF THE INVENTION

The object of the present invention is to provide a method for producing solid particulate olefin polymerisation catalyst or carrier having a unimodal and narrow particle size distribution, defined by a volumetric SPAN of 0.7 or less. The method comprises a combination of a specific unimodal liquid atomisation method with a spray-drying method. The unimodal liquid atomisation method comprises a vibrating nozzle with a capillary orifice with a diameter of 5 to 100 μm generating the laminar jet of liquid, which disintegrates into droplets of uniform size entering into the spray-dryer.

Liquid atomization takes place with an atomizer using a spray nozzle to disperse the liquid into the spray dryer.

Spray drying is generally a method for producing a dry powder from a liquid or slurry by drying the liquid or slurry under conditions (e.g. pressure, temperature, partial pressure of the solvent), where the selected solvent evaporates out of the droplets. Typically, a gas with increased temperature is used for drying. Temperature of the gas is dependent on the solvent to be evaporated out from the droplets. Generally, the drying gas can be passed in as a co-current, i.e. as same direction as the sprayed liquid from the atomizer, or counter-current, where the gas flows against the flow from the atomizer. With counter-current flow, particles spend more time in the system and the fluid is usually paired with a fluidized bed system. Co-current flow often allows the system to operate more efficiently, but is not suitable for very small particles.

The invention relates also to the use of the combined unimodal liquid atomisation method with spray-drying method for producing particulate olefin polymerisation carriers and catalysts. Further, the object of the present invention is to use of the catalyst as defined above or prepared by the method of the invention for producing olefin polymers of α-olefins of 2 to 10 C-atoms, or copolymers thereof with ethylene and/or other α-olefins of 3 to 12 C-atoms.

In addition, the invention relates to a catalyst system comprising the olefin catalyst as defined above, or prepared by the method as herein described, a cocatalyst and optionally an external electron donor, and use of said catalyst system in olefin polymerisation process.

It has now been surprisingly found that a solid particulate catalyst or catalyst carrier having a volumetric SPAN of 0.7 or less can be prepared by the method as described in claim 1 and dependent claims thereof.

Thus, the present invention relates to a process for producing of solid particulate olefin polymerisation catalyst or carrier comprising the steps
  i) forming a solution of the catalyst or a carrier in a solvent,
  ii) subjecting the solution into an atomization by spraying the solution via a capillary vibrating spray nozzle with a capillary orifice having a diameter of 5 to 100 μm generating a laminar jet of liquid, which disintegrates into liquid droplets entering into the spray-dryer,
  iii) transforming the droplets with aid of a gas to solid particulate catalyst or carrier in the spray-dryer,
  iv) recovering the solid particulate olefin polymerisation catalyst or carrier having a particle size distribution defined by a volumetric SPAN of 0.7 or less.

The method allows formation of the olefin polymerisation catalyst, if catalyst components are present during the spray-drying method. If only catalyst carrier components are present during the spray-drying method, the obtained particulate material is catalyst carrier. The obtained carrier is to be further treated with other catalyst components to obtain the olefin polymerisation catalyst.

In preparing a catalyst or catalyst carrier by the method of the invention the drying gas is preferably inert gas.

According to the present invention the solid particulate olefin polymerisation catalysts and carriers having the SPAN 0.7 or less are obtainable, preferably obtained, directly from the manufacturing process without a need of using any classification methods, like screening methods as an after-treatment step to remove the non-desired particles from the particulate catalyst or carrier material.

As indicated above many problems in a polymerisation process and post reactor processes can be avoided, when a catalyst having a uniform and narrow particle size distribution is used in the polymerisation process.

DETAILED DESCRIPTION OF THE INVENTION

According to the present invention solid particulate olefin catalysts and catalyst carriers are prepared by a method using a combination of a specific unimodal liquid atomisation method with a spray-drying method.

According to the method of the invention first, in step i), a solution of an olefin polymerisation catalyst or a carrier is provided. Said solution is then, in step ii), subjected to an atomization step by spraying the solution via a vibrating spray nozzle with a capillary orifice with a diameter of 5 to 100 μm, whereby a laminar jet of liquid is generated, which disintegrates into liquid droplets of monodispersed size entering into the spray-dryer.

The size of the disintegrated liquid droplets formed from the laminar jet of liquid is higher than the capillary diameter. Based on experimental results the diameter of the droplets may be approximately up to twice as high as the capillary orifice diameter. Droplet size may be detected e.g. visually or using a high speed camera. The method is described in more detail in the experimental part.

There are also scientific theories on the capillary phenomena of jets, and theoretical calculations of droplet size. Such calculations are known as Rayleigh equations on droplet formation.

The desired size range of the droplets is in the range of 10-200 μm when coming out from the nozzle. The droplet size depends on the capillary orifice diameter. Further, the properties of the solvent used in the solution, e.g. viscosity, has effect on the droplet size.

The atomisation takes place by using a capillary vibrating spray nozzle. Several techniques may be used to create vibrating, like ultrasonic vibrating or piezoelectric vibrating. Thus, one preferred spray nozzle is a capillary piezoelectric vibrating spray nozzle.

Transformation of the formed droplets into solid particles of uniform particle size takes place in the spray-dryer (step iii)) using a gas to dry, i.e. to evaporate the solvent from the droplets for obtaining the solid particles.

For preparing particulate catalyst or carrier the gas used in the spray-dryer is preferably inert, typically nitrogen gas. The temperature of the gas should be hot enough to be able to evaporate the solvent out of the droplets, but not to be too hot in order not to degrade the catalytic material in the droplets.

The particle size of the olefin polymerisation catalyst and carrier can be controlled in several ways, e.g. by selecting the orifice diameter in the capillary spray nozzle. Further, by adjusting the temperature of the liquid jet feed and/or the gas flow the formation of solid particles in the spray-dryer can be controlled. Selected temperature is dependent on the solvent used in forming the solution.

The solid particles are recovered from the spray-dryer at the bottom of the dryer.

In a preferred embodiment in a vertical spray tower free-falling droplets solution of catalyst or carrier are transformed to solid olefin polymerisation catalyst or carrier particles with a co-current drying gas stream, preferably nitrogen. More preferably laminar gas flow is used. The solid particles are collected in the collection zone at the bottom of the dryer.

FIG. 1 discloses a general schema of the method using the co-current drying gas stream.

Figure 2:
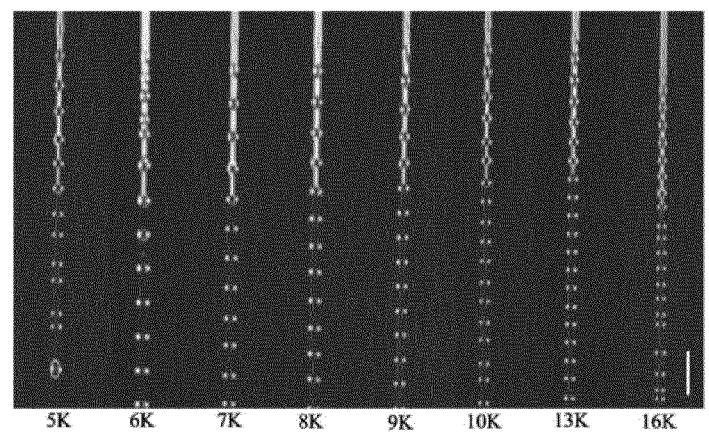

FIG. 2 discloses a laminar liquid jet break-up in the capillary nozzle of device used in the invention.

Figure 3:
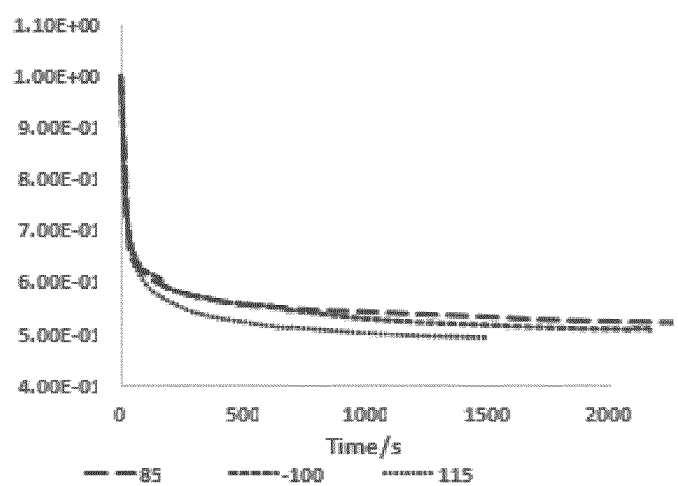

FIG. 3 discloses diameter profiles of inventive catalyst carrier of IE1 at drying temperatures of 85° C., 100° C., and 115° C.

According to FIG. 1, the solution of the catalyst or carrier to be transformed to solid particles is fed via line (2) into the spray-dryer (1), through the capillary vibrating spray nozzle (3). Inert gas is fed via line (4), removed via line (5) and solid particles are removed via line (6).

The particles collected are characterized with high uniformity and a very narrow particle size distribution defined by volumetric SPAN of 0.7 or less.

In another embodiment a counter current stream instead of co-current stream of drying gas can be used, however, preferably co-current stream is used.

The preferred size of the solid particles is in the range of 5-150 µm, more preferably in the range of 5 to 100 µm.

Depending on the chemistry and raw materials used, the particulate material collected at the bottom of the spray-dryer can be used directly for polymerisation of olefins; or in case a catalyst carrier is prepared, the carrier can be subjected to additional treatment in order to prepare a desired polymerisation catalyst in particulate form. The resulting catalyst particles, either obtained directly from the process or obtained by treating the carrier with other catalyst components, are highly uniform and have a narrow particle size distribution with a SPAN 0.7 or less.

In a preferred embodiment the solid particulate olefin polymerisation catalyst or carrier is prepared by the method comprising the steps
  i) forming a solution of the catalyst or a carrier in a solvent,
  ii) subjecting the solution into an atomization by spraying the solution via a capillary vibrating spray nozzle with a capillary orifice diameter of 5 to 100 µm generating a laminar jet of liquid, which disintegrates into liquid droplets entering into the spray-dryer,
  iii) transforming the droplets with aid of co-current inert gas to solidify particulate catalyst or carrier in the spray-dryer,
  iv) recovering the solid particulate olefin polymerisation catalyst or carrier having particle size distribution defined by a volumetric SPAN of 0.7 or less and having the medium particle size in the range of 5 to 150 µm.

In the present application the following indicators for catalyst particle size and particle size distribution are used:

Particle size distribution (PSD):

PSD is defined by using SPAN as a relative distribution of particles based on volumetric amounts of particles, i.e. as volumetric SPAN ($SPAN_{vol}$).

$SPAN_{vol} = (D90_{vol} - D10_{vol})/D50_{vol}$, where $D90_{vol}$=particle diameter at 90% cumulative volume, $D10_{vol}$=particle diameter at 10% cumulative volume, $D50_{vol}$=particle diameter at 50% cumulative volume (median particle size, vol)

$SPAN_{vol}$, $D90_{vol}$, $D10_{vol}$ and $D50_{vol}$ are often disclosed in the field without a subscript "$_{vol}$", i.e. as SPAN, D90, D10 and D50, respectively. In the present application, if no subscript is used, SPAN, D90, D10 and D50 are all volumetric values.

The solid catalyst or carrier particles with the desired narrow particle size distribution are obtained without any need to remove of the particles of non-desired particle size. Thus, the final solid, particulate olefin polymerisation catalyst or carrier with desired medium particle size and particle size distribution is obtained directly from the preparation method of the invention without using any screening step.

Particles of the solid particulate olefin polymerisation catalyst or carrier particles of the present invention and/or prepared by the method of the invention have the SPAN of 0.70 or below, preferably 0.60 or below, more preferably 0.50 or below. In an especially preferred embodiment SPAN may be even 0.3 or below.

Particles of the solid particulate olefin polymerisation catalyst or carrier particles of the present invention and/or prepared by the method of the invention have median particle size $D50_{vol}$ in the range of 5 to 150 µm, preferably in the range of 5 to 100 µm.

According to a preferred embodiment the solid particulate olefin polymerisation catalyst or carrier has the volumetric SPAN of 0.6 or less, even more preferably 0.5 or less and the medium particle size in the range of 5 to 150 µm, preferably in the range of 5 to 100 µm.

The solid particulate olefin polymerisation catalyst or catalyst carrier according to the invention or prepared according to the process of the invention is preferably a Ziegler-Natta catalyst.

Ziegler-Natta catalysts prepared by the method according to the invention comprise a compound of Group 2 metal, compound of Group 4 to 10 transition metal, or of a lanthanide or actinide, optionally a compound of Group 13 metal and optionally an internal electron donor. The compound of Group 2 metal is preferably a magnesium compound, like magnesium halide, especially magnesium dichloride.

The particulate carrier of the invention or prepared by the process of the invention is a Mg dihalide based carrier comprising an adduct of formula $MgCl_2 \cdot mROH$ as defined below.

Magnesium dihalide is used as a starting material for producing a carrier. The solid carrier used in this invention is a carrier where alcohol is coordinated with Mg dihalide, preferably $MgCl_2$. The Mg dihalide, preferably $MgCl_2$, is mixed with an alcohol (ROH) and the solid carrier of formula $MgCl_2 \cdot mROH$ is formed according to the method of the invention. The alcohol in producing $MgCl_2 \cdot mROH$ carrier material is an alcohol ROH, where R is a linear or branched alkyl group containing 1 to 12 carbon atoms, preferably 1 to 8 carbon atoms, like 1 to 4 carbon atoms. Ethanol is typically used. In $MgCl_2 \cdot mROH$, m is 0 to 6, more preferably 1 to 4, especially 2,5 to 3,6. The adduct may also comprise a Lewis base, like an ether, ester, ketone, silane or amine or mixtures thereof.

The transition metal compound is preferably a compound of Group 4 to 6, more preferably a Group 4 transition metal compound or a vanadium compound and is still more preferably a titanium compound. Particularly preferably the titanium compound is a halogen-containing titanium compound of the formula $X_y Ti(OR^8)_{4-y}$, wherein $R^8$ is a $C_{1-20}$ alkyl, preferably a $C_{2-10}$ and more preferably a $C_{2-8}$ alkyl group, X is halogen, preferably chlorine and y is 1, 2, 3 or 4, preferably 3 or 4 and more preferably 4.

Suitable titanium compounds include trialkoxy titanium monochloride, dialkoxy titanium dichloride, alkoxy titanium trichloride and titanium tetrachloride, and is most preferably titanium tetrachloride.

The internal electron donors if comprised in the catalyst are suitable among others, (di)esters of carboxylic (di)acids, like phthalates or (di)esters of non-phthalic carboxylic (di)acids, ethers, diethers or oxygen or nitrogen containing silicon compounds, or mixtures thereof.

The solid Ziegler-Natta catalyst may also contain a compound of a Group 13 metal, preferably an aluminium alkyl compound of the formula $AlR_{3-m-n}R'_m X_n$, where R is an alkyl, R' is an alkoxy group of 1 to 20, preferably of 1 to 10 carbon atoms, X is a halogen, preferably chloride, m is 0, 1 or 2 and n is 0, 1 or 2, provided that the sum of m+n is at most 2.

Typically, the amount of Ti is in the range of 1-10 wt-%, the amount Mg is in the range of 5 to 25 wt-%, the amount of the internal electron donor is in the range of 0 to 40 wt-% and the amount of Al is in the range of 0 to 10 wt-% in the Ziegler-Natta catalyst of the invention or prepared by the method of the invention.

The catalyst system of the invention comprises, in addition to the solid catalyst as defined above, a cocatalyst, which is also known as an activator, and optionally an external electron donor. Cocatalyst and the optional external electron donor are fed separately to the polymerization process, i.e. they are not part of the solid Ziegler-Natta catalyst.

Cocatalysts are preferably organometallic compounds of Group 13 metal, typically aluminium compounds. These compounds include aluminium alkyls and alkyl aluminium halides. Preferably the alkyl group is a C1-C8 alkyl group, preferably C1-C4 alkyl group, and the halide is a chloride. Preferably the co-catalyst (Co) is a tri (C1-C4) alkylaluminium, di(C1-C4)alkyl aluminium chloride or (C1-C4) alkyl aluminium dichloride or mixtures thereof. Most preferably the alkyl group is ethyl. In one specific embodiment the co-catalyst (Co) is triethylaluminium (TEAL).

External electron donors are typically used in propylene polymerization, however also known to be used in ethylene polymerisation.

Suitable external donors (ED) include certain silanes, ethers, esters, amines, ketones, heterocyclic compounds and blends thereof. It is especially preferred to use silanes selected from silanes of the general formula (A)

$$R^a_p R^b_q Si(OR^c)_{(4-p-q)} \quad (A)$$

wherein $R^a$, $R^b$ and $R^c$ are independently same or different a linear, branched or cyclic hydrocarbon group having 1 to 12 carbon atom, in particular an alkyl or cycloalkyl group, and wherein p and q are numbers ranging from 0 to 3 with their sum p+q being equal to or less than 3; or silanes of general formula (B)

$$Si(OCH_2CH_3)_3(NR^3R^4) \quad (B)$$

wherein $R^3$ and $R^4$ can be the same or different and represent a linear, branched or cyclic hydrocarbon group having 1 to 12 carbon atoms.

Most preferably external donors, when used, are selected form silanes of formula (A) and especially selected from $(CH_3)_2Si(OCH_3)_2$, $(tert-butyl)_2Si(OCH_3)_2$, $(cyclohexyl)(methyl)Si(OCH_3)_2$, $(cyclopentyl)_2Si(OCH_3)_2$ and $(phenyl)_2Si(OCH_3)_2$.

The catalyst of the present invention is used for polymerising $C_2$ to $C_{10}$ olefins, preferably $C_2$ to $C_6$ olefins, optionally with one or more comonomers of $C_2$ to $C_{12}$ olefins. Most commonly produced olefin polymers are polyethylene and polypropylene or copolymers thereof. Commonly used comonomers are alpha-olefin comonomers selected from $C_2$-$C_{12}$-alpha-olefins, preferably selected from $C_2$-$C_{10}$-alpha-olefins, such as ethylene (for propylene copolymer), 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the comonomer is 1-butene and/or 1-hexene. For propylene copolymers ethylene and/or 1-butene is a commonly used comonomer.

The present invention is also directed to a polymerisation process for producing polymers of ethylene or α-olefin monomers of 3 to 10 C-atoms, or copolymers thereof with ethylene and/or other α-olefins comonomers of 3 to 12 C-atoms comprising steps a1) preparing a solid particulate olefin polymerisation catalyst by the process as defined in any of claim 1 to 7, or a2) preparing a solid particulate catalyst carrier by the process as defined in any of claims 1 to 7 and treating the obtained carrier with catalyst compounds to form a solid particulate olefin polymerisation catalyst, b) polymerising ethylene or said α-olefins, optionally with said comonomer(s) in the presence of the catalyst as prepared in step a1) or a2) or in the presence of a solid particulate olefin polvmerisation catalvst or catalvst carrier as defined herein, wherein the catalyst is a Ziegler-Natta catalyst or the carrier is a $MgCl_2$ based carrier as defined herein, with a cocatalyst of a compound of Group 13 metal and optionally an external electron donor in polymerisation conditions in at least one polymerisation reactor.

The present preparation method is especially suitable for preparing a $MgCl_2$ based catalyst carrier as defined above, which can then be treated with a titanium compound, like $TiCl_4$ and optionally with an aluminium compound and optionally with an internal electron donor to obtain the desired olefin polymerisation catalyst in solid particulate form.

Polymerisation

Catalyst of the present invention can be used in any commonly used uni- and multimodal processes for producing polyolefins. The polymerizations may be operated in slurry, solution, or gas phase conditions or their combinations. Typically ethylene and propylene (co)polymers are produced in commercial scale in a multimodal process configuration. Such multimodal polymerization processes known in the art comprise at least two polymerization stages. It is preferred to operate the polymerization stages in cascaded mode. Suitable processes comprising cascaded slurry and gas phase polymerization stages are disclosed, among others, in WO92/12182 and WO96/18662 and WO WO98/58975.

In a multimodal polymerisation configuration, the polymerisation stages comprise polymerisation reactors selected from slurry and gas phase reactors. In one preferred embodiment, the multimodal polymerisation configuration comprises at least one slurry reactor, followed by at least one gas phase reactor.

The catalyst may be transferred into the polymerization process by any means known in the art. It is thus possible to suspend the catalyst in a diluent and maintain it as homogeneous slurry. Especially preferred is to use oil having a viscosity from 20 to 1500 mPa·s as diluent, as disclosed in WO-A-2006/063771. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP-A-428054.

The polymerization in slurry may take place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms, like propane or a mixture of such hydrocarbons. In propylene polymerisation the monomer is usually used as the reaction medium.

The temperature in the slurry polymerization is typically from 40 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art. Furthermore, one or more alpha-olefin comonomers may be added into the reactor. The actual amount of such hydrogen and comonomer feeds depends on the desired melt index (or molecular weight), density or comonomer content of the resulting polymer.

The polymerization in gas phase may be conducted in a fluidized bed reactor, in a fast fluidized bed reactor or in a settled bed reactor or in any combination of these.

Typically the fluidized bed or settled bed polymerization reactor is operated at a temperature within the range of from 50 to 100° C., preferably from 65 to 90° C. The pressure is suitably from 10 to 40 bar, preferably from 15 to 30 bar.

Also antistatic agent(s) may be introduced into the slurry and/or gas phase reactor if needed. The process may further comprise pre- and post-reactors.

The polymerization steps may be preceded by a pre-polymerisation step. The pre-polymerisation step may be conducted in slurry or in gas phase. Preferably pre-polymerisation is conducted in slurry, and especially in a loop reactor. The temperature in the pre-polymerisation step is typically from 0 to 90° C., preferably from 20 to 80° C. and more preferably from 30 to 70° C.

The pressure is not critical and is typically from 1 to 150 bar, preferably from 10 to 100 bar.

The polymerisation may be run continuously or batch wise, preferably the polymerisation is carried out continuously.

Experimental Part
Measurement Methods
Measurement Methods
ICP Analysis (Al, Mg, Ti)

The sample consisting of dry catalyst powder is mixed so that a representative test portion can be taken. Approximately 20-50 mg of sample is sampled in inert atmosphere into a 20 ml volume crimp cap vial and exact weight of powder recorded.

A test solution of known volume (V) is prepared to a volumetric flask. Sample digestion is performed in the cooled vial by adding a small amount of freshly distilled (D) water (5% of V) followed by concentrated nitric acid ($HNO_3$, 65%, 5% of V). The mixture is transferred to the volumetric flask. The solution diluted with D water up to the final volume, V, and left to stabilise for two hours.

The elemental analysis of the aqueous samples is performed at room temperature using a Thermo Elemental iCAP 6300 Inductively Coupled Plasma—Optical Emission Spectrometer (ICP-OES). The instrument is calibrated for Al, Ti and Mg using a blank (a solution of 5% $HNO_3$) and six standards of 0.5 ppm, 1 ppm, 10 ppm, 50 ppm, 100 ppm and 300 ppm of Al, Ti and Mg in solutions of 5% $HNO_3$ DI water. Curvelinear fitting and 1/concentration weighting is used for the calibration curve.

Immediately before analysis the calibration is verified and adjusted (instrument function named 'reslope') using the blank and a 300 ppm Al, 100 ppm Ti, Mg standard. A quality control sample (QC; 20 ppm Al and Ti, 50 ppm Mg in a solution of 5% $HNO_3$ in DI water) is run to confirm the reslope. The QC sample is also run after every $5^{th}$ sample and at the end of a scheduled analysis set.

The content of magnesium is monitored using the 285.213 nm and the content for titanium using 336.121 nm line. The content of aluminium is monitored via the 167.079 nm line, when Al concentration in test portion is between 0-10 wt % and via the 396.152 nm line for Al concentrations above 10 wt %.

The reported values are an average of three successive aliquots taken from the same sample and are related back to the original catalyst sample based on input of the original weight of test portion and the dilution volume into the software.

GC Analysis, Ethanol Content

The sample consisting of dry precatalyst powder is mixed so that a representative test portion is taken. Approximately 70-150 mg is sampled in inert atmosphere into a 20 mL glass vial, and the total weight is recorded. The vial is capped with a septum cap and removed from a glovebox. The septum is punctured with a pressure relief needle, and then 10.0 ml of distilled water and 60.0 mg of n-propanol (internal standard) are added. The sample is left to be dissolved in water fully, ultrasonic bath is used if no full dissolution is achieved.

The analysis is performed on a Agilent 6890 gas chromatograph equipped with a split loop injector, G1888 head space autosampling unit and a flame ionization detector. The column is a DB-1, 30 m long with an inner diameter of 0.25 mm and a phase thickness of 1 μm. Head space oven temperature was 60° C. A reference sample containing known amounts of ethanol an n-propanol was run in the beginning of each measurement series in order to determine the component and internal standard factors. The results were calculated in the following manner:

$$\text{Ethanol wt. \%} = \frac{A(Et) \times Rf(Et) \times N}{A(Int) \times Rf(Int) \times M} \times 100$$

where:
A(Et)=Ethanol component area
F(Et)=component factor
N=mass of internal standard (n-propanol), mg
A(Int)=area of internal standard (n-propanol)
F(Int)=factor of internal standard (n-propanol)
M=mass of the sample, mg Melt Flow Rate The melt flow rate is measured in accordance with ISO 1133 and is indicated as g/10 min.
$MFR_2$: 190° C., 2.16 kg load; for polyethylene
$MFR_2$: 230° C., 2.16 kg load; for polypropylene Melt Temperature Melt temperature is measured by Differential Scanning calorimeter (DSC) according to ISO 11357 using Mettler DSC2 Differential Scanning calorimeter (DSC) on 5-10 mg samples.

Co-Monomer Content in PE by FTIR Spectroscopy

Co-monomer content is determined based on Fourier transform infrared spectroscopy (FTIR) using Bruker Tensor 37 spectrometer together with OPUS software.

Approximately 0.3 grams of sample is compression-moulded into films with thickness of 250 μm. Silicone paper is used on both sides of the film. The films are not touched by bare hands to avoid contamination. The films are pressed by using Fontijne Press model LabEcon 300. The moulding is carried out at 160° C. with 2 min pre-heating+2 min light press+1 min under full press. The cooling is done under full press power for 4 minutes.

The 1-butene co-monomer content is determined from the absorbance at the wave number of approximately 1378 $cm^{-1}$ and the reference peak is 2019 $cm^{-1}$. The analysis is performed using a resolution of 2 $cm^{-1}$, wave number span from 4000 to 400 $cm^{-1}$ and the number of sweeps of 128. At least two spectra are obtained from each film.

The co-monomer content is determined from a spectrum from the wave number range of 1400 $cm^{-1}$ to 1330 $cm^{-1}$. The baseline is determined using the following method:

within the set wavenumber range, the highest peak is located and then the minima to the left and to the right of this highest peak. The baseline connects these minima. The absorbance value at the highest peak is divided by the area of the reference peak.

The calibration plot for the method is produced for each co-monomer type separately. The co-monomer content of an unknown sample needs to be within the range of the co-monomer contents of the calibration samples. The co-monomer content in the calibration sample materials is predetermined by NMR-spectrometry.

The co-monomer content is calculated automatically by using calibration curve and the following formula:

$$W_E = C_1 \times A_0 + C_0$$

where
$W_E$=result in wt %
$A_0$=absorbance of the measured peak ($A_Q$) to the area of the reference peak ($A_R$);
$C_1$=slope of the calibration curve;
$C_0$=offset of the calibration curve.

The co-monomer content is determined from both of the obtained spectra, and the value is calculated as the average of these results.

Xylene Solubles XS

The content of the polymer soluble in xylene is determined according to ISO 16152; 5th edition; 2005-07-01 at 25° C.

Particle Size Distribution—Automated Image Analysis

The sample consisting of dry catalyst powder is mixed so that a representative test portion can be taken. Approximately 50 mg of sample is sampled in inert atmosphere into a 20 ml volume crimp cap vial and exact weight of powder recorded. A test solution is prepared by adding white mineral oil to the powder so that the mixture holds a concentration of approximately 0.5-0.7 wt-%. The test solution is carefully mixed before taking a portion that is placed in a measuring cell suitable for the instrument. The measuring cell should be such that the distance of between two optically clean glasses is at least 200 μm.

The image analysis is run at room temperature on a Malvern Morphologi 3G system. The measuring cell is placed on a microscopy stage with high precision movement in all directions. The physical size measurement in the system is standardised against an internal grating or by using an external calibration plate. An area of the measuring cell is selected so that the distribution of the particles is representative for the test solution. This area is recorded in partially overlapping images by a CCD camera and images stored on a system specific software via a microscope that has an objective sufficient working distance and a magnification of five times. Diascopic light source is used and the illumination intensity is adjusted before each run. All images are recorded by using a set of 4 focal planes over the selected area. The collected images are analysed by the software where the particles are individually identified by comparison to the background using a material predefined greyscale setting. A classification scheme is applied to the individually identified particles, such that the collected population of particles can be identified to belong to the physical sample. Based on the selection through the classification scheme further parameters can be attributed to the sample.

The particle diameter is calculated as the circular equivalent (CE) diameter. The size range for particles included in the distribution is 6.8-200 μm. The distribution is calculated as a numerical moment-ratio density function distribution and statistical descriptors calculated based on the numerical distribution. The numerical distribution can for each bin size be recalculated for an estimate of the volume transformed distribution.

All graphical representations are based on a smothering function based on 11 points and the statistical descriptors of the population are based on the unsmothered curve. Span is calculated as the (CE D[x, 0.9]−CE D[x, 0.1])/CE D[x, 0.5].

The following particle size and particle size distribution indicators have been used in the experiments:
$D90_{vol}$=particle diameter at 90% cumulative volume,
$D10_{vol}$=particle diameter at 10% cumulative volume,
$D50_{vol}$=particle diameter at 50% cumulative volume (median particle size, vol)
$SPAN_{vol} = (D90_{vol} - D10_{vol})/D50_{vol}$ Single Droplet Drying Experiments Single droplet of $MgCl_2$ solution in absolute ethanol (6%) of approximately 3 μL was placed on a glass filament submerged in a gas chamber and adjacent to a high resolution video camera. Laminar upstream flow of $N_2$ gas at varied temperature (85-115° C.) was then applied, and the evolution of droplet temperature and diameter were recorded with a thermocouple and video camera, respectively. Terminal particle diameter reached upon drying was approximately 50% of the original droplet diameter (see FIG. 2).

EXAMPLES

Carrier Preparation

Inventive Examples 1 and 2 (IE1 and IE2)

A particulate $MgCl_2$.EtOH catalyst carrier for olefin polymerisation catalyst was prepared by utilizing a laboratory spray drier with a capillary piezoelectric spray nozzle with a 75 micron orifice diameter. Heated $N_2$ was used to dry the droplets, forming solid $MgCl_2$.EtOH carrier particles. Nitrogen gas cooled down, when flowing down. A 6 wt-% solution of anhydrous $MgCl_2$ in dry ethanol was used as a carrier solution.

The experimental conditions for producing the carriers are disclosed in Table 1 and the composition and properties of the resulting $MgCl_2$.EtOH particles are disclosed in Table 2.

Experimentally measured PSD of the inventive carrier of IE1 is disclosed in a curve of FIG. 3.

TABLE 1

| | Conditions for producing the spray-dried $MgCl_2$-Ethanol particles according to the invention. | | | | |
|---|---|---|---|---|---|
| Experiment conditions | $N_2$ inlet temperature [° C.] | $N_2$ outlet temperature [° C.] | $N_2$ flow [dm³/min] | Liquid feed rate [ml/min] | Piezoelectric ceramic frequency [kHz] |
| IE 1 | 183 | 87 | 249 | 1.20 | 8.0 |
| IE2 | 162 | 75 | 180 | 1.10 | 8.0 |

Comparative Examples 1 and 2 (CE1 and CE2)

As comparative examples were used two different samples of MgCl$_2$.EtOH carrier prepared via spray-crystallization technique using a rotating atomizer according to WO9221705. The spray-crystallization process was followed by fractionating of the particles via sieving to obtain different size fractions with relatively narrow size distribution.

TABLE 2

Composition and properties of the MgCl$_2$*EtOH carrier samples.

| Sample | Mg, wt. % | EtOH, wt. % | D50, microns | Span | Morphology |
|---|---|---|---|---|---|
| IE1 | 12.3 | 48.2 | 70 | 0.29 | Spherical |
| IE2 | 14.1 | 55.2 | 72 | 0.13 | Spherical |
| CE1 | 10.0 | 59.3 | 64 | 0.75 | Sphere |
| CE2 | 10.1 | 59.0 | 40 | 0.73 | Sphere |

Catalyst Preparation

Inventive Example 3 (IE3)

Catalyst was prepared according to the method as described in Inventive example 1 of WO2016097193A1, however, using the MgCl$_2$.EtOH carrier prepared in IE1 of the present application having D50 of 70 µm. DTHFP (bis-ditetrahydrofuryl) propane has been used as an internal electron donor in the preparation.

Inventive Example 4 (IE4)

Catalyst was prepared according to the method as described in Inventive example 1 of WO2016097193A1, however, using the MgCl$_2$.EtOH carrier prepared in IE2 of the present application having D50 of 72 µm. DTHFP (bis-ditetrahydrofuryl)propane has been used as an internal electron donor in the preparation.

Comparative Example 3 (CE3)

Catalyst was prepared using the preparation as described in IE3, however, using as carrier a spherical MgCl$_2$-Ethanol carrier obtained through conventional spray crystallization and subsequent sieving according to CE1.

Inventive Example 5 (IE5)

Propylene polymerisation catalyst was prepared using the spherical carrier of IE2. In a 100 mL glass reactor equipped with an overhead stirrer was loaded with titanium tetrachloride (41 mL). Bis(2-ethylhexyl)citraconate (0.57 g) was added at room temperature under stirring. The mixture was cooled down to −10° C. A suspension of the solid carrier (3.36 g) in heptane (10 mL) was added dropwise to the resulting solution under stirring at −10° C. over 5 minutes. After additional stirring for 10 minutes at −10°, the mixture was heated up to 110° C. over 90 minutes under stirring. After additional 30 minutes at 110° C., the stirring was stopped and the solid material was allowed to settle. The supernatant liquid was siphoned off and discarded. Titanium tetrachloride (41 mL) was added and the mixture was then stirred for 30 minutes at 100° C. After settling and siphoning off the supernatant liquid, the TiCl4 wash has been repeated once more followed by three washes with n-heptane (60 mL) at 80° C. The solid catalyst was then dried under N$_2$ flow at 60° C. and was then collected in the form of brown free-flowing powder.

Comparative Example 4 (CE4)

Catalyst was prepared using the preparation as described in IE5, however, using as carrier a spherical MgCl2-Ethanol carrier obtained through conventional spray crystallization and subsequent sieving according to CE1.

Catalyst properties of examples IE3-IE5 and CE3-CE4 are disclosed in Tables 3 and 4

Polymerisation

Bench-Scale Ethene Copolymerization with 1-Butene,

Inventive Examples p-IE6 and p-IE7, Comparative Example p-CE5

The catalyst (8.5 mg) was tested in copolymerization with 1-butene. Triethylaluminum (TEA) was used as a co-catalyst with an Al/Ti molar ratio of 15. The polymerization reaction was carried out in a 3 L bench-scale reactor in accordance with the following procedure:

An empty 3 L bench-scale reactor was charged with 55 mL of 1-butene at 20° C. and stirred at 200 rpm. Then 1250 mL of propane was added to the reactor as a polymerization medium, followed by the addition of hydrogen gas (0.75 bar). The reactor was heated to 85° C., and ethylene (3.7 bar) was added batchwise. The reactor pressure was kept at 0.2 bar of overpressure and stirring speed was increased to 550 rpm. The catalyst and the co-catalyst were added together (a few seconds of pre-contact between catalyst and TEA) to the reactor with additional 100 mL of propane. The total reactor pressure was maintained at 38.3 bar by continuous ethylene feed. The polymerization was stopped after 60 min by venting off the monomers and H$_2$. The obtained polymer was left to dry in a fume hood overnight before weighing.

The results of the catalysts and polymerization are shown in Table 3

Bench Scale Propylene Homopolymerisation

Inventive Example p-IE8, Comparative Example p-CE6

The catalyst (10.8 mg) was tested in propylene homopolymerisation. Triethylaluminum (TEA) was used as a co-catalyst with an Al/Ti molar ratio of 250. Dimethoxydicyclopentylsilane was used as an external donor at donor/Ti molar ratio of 25. The polymerization reaction was carried out in a 5 L stirred autoclave reactor in accordance with the following procedure:

About 0.9 ml triethyl aluminium (TEA) (from Witco, used as received) as a co-catalyst, ca 0.13 ml dicyclopentyl dimethoxy silane (DCDS), from Wacker, dried with molecular sieves, as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA external donor/n-pentane mixture was added to the reactor. Hydrogen (200 mmol) and 1400 g propylene were introduced into the reactor and the temperature was raised within ca 15 minutes to the polymerisation temperature (80° C.). The polymerisation time after reaching polymerisation temperature was 60 minutes, after which the polymer formed was taken out from the reactor and dried a fumehood overnight before weighing.

The results of the catalysts and polymerization are shown in Table 4

TABLE 3

Ethylene polymerisation catalysts and polymerisation results

| | | | | Catalyst properties | | | Polymer properties | | |
|---|---|---|---|---|---|---|---|---|---|
| Polym. example | Carrier example | Carrier span | Catalyst example | Ti wt % | Mg wt % | Donor wt % | MFR2 g/10 min | Tm ° C. | C4 wt % |
| p-CE5 | CE1 | 0.75 | CE3 | 7.0 | 14.2 | 8.9 | 0.7 | 123.8 | 3.7 |
| p-IE6 | IE1 | 0.29 | IE3 | 7.1 | 11.3 | 3.0 | 1.47 | 124.5 | 4.6 |
| p-IE7 | IE2 | 0.13 | IE4 | 7.5 | 12.1 | 6.6 | 1.26 | 125.4 | 4.9 |

*na—not available

TABLE 4

Propylene polymerisation catalysts and polymerisation results

| | | | | Catalyst properties | | | Polymer properties | | |
|---|---|---|---|---|---|---|---|---|---|
| Polym example | Carrier example | Carrier span | Catalyst example | Ti wt % | Mg wt % | Donor wt % | MFR2 g/10 min | BD kg/m3 | XS wt % |
| p-CE6 | CE1 | 0.75 | CE4 | 4.7 | 17.9 | 7.1 | 17.5 | 410 | 2.4 |
| p-IE8 | IE2 | 0.13 | IE5 | 2.5 | 13.6 | 10.1 | na | na | na |

The invention claimed is:

1. A process for producing a solid particulate olefin polymerization catalyst or catalyst carrier, the process comprising the steps:
   i) forming a solution of the catalyst or catalyst carrier in a solvent,
   ii) subjecting the solution into an atomization by spraying the solution via a capillary vibrating spray nozzle with a capillary orifice having a diameter of 5 to 100 μm thereby generating a laminar jet of liquid, which disintegrates into liquid droplets entering into a spray-dryer,
   iii) transforming the droplets to the solid particulate olefin polymerization catalyst or catalyst carrier in the spray-dryer with aid of a gas, and
   iv) recovering the solid particulate olefin polymerization catalyst or catalyst carrier having a particle size distribution defined by a volumetric SPAN of 0.7 or less.

2. The process according to claim 1, wherein the solid particulate olefin polymerization catalyst or catalyst carrier has a medium particle size in the range of 5 to 150 μm.

3. The process according to claim 1, wherein in step iii) the gas is inert and is used as a co-current gas flow.

4. The process according to claim 1, wherein the solid particulate olefin polymerization catalyst is a Ziegler-Natta catalyst.

5. The process according to claim 1, wherein the catalyst carrier is treated with a compound of a transition metal, to obtain the polymerization catalyst in solid particulate form.

6. The process according to claim 1, wherein the solid particulate olefin polymerization catalyst carrier is a $MgCl_2$ based carrier comprising an adduct of formula $MgCl_2*mROH$, where R is a linear or branched alkyl group containing 1 to 12 carbon atoms.

7. The process according to claim 1, wherein the solid particulate olefin polymerization catalyst or catalyst carrier has a volumetric SPAN of 0.5 or less.

8. A polymerization process for producing polymers of ethylene or α-olefin monomers of 3 to 10 C-atoms, or (co)polymers thereof with ethylene and/or other α-olefin comonomers of 3 to 12 C-atoms, the process comprising the steps of:
   a) preparing a solid particulate catalyst carrier by the process of claim 1 and treating the solid particulate catalyst carrier with catalyst compounds to form a solid particulate olefin polymerization catalyst, and
   b) polymerizing ethylene or α-olefinmonomers, optionally with comonomer(s), in the presence of the solid particulate olefin polymerization catalyst prepared in step a) under polymerization conditions in at least one polymerization reactor.

* * * * *